US011863085B2

(12) United States Patent
Reisinger et al.

(10) Patent No.: US 11,863,085 B2
(45) Date of Patent: Jan. 2, 2024

(54) CONVERTER ASSEMBLY

(71) Applicant: AVL List GmbH, Graz (AT)

(72) Inventors: Erwin Reisinger, Feldkirchen bei Graz (AT); Martin Schmidt, Langen (DE)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 17/909,046

(22) PCT Filed: Mar. 5, 2021

(86) PCT No.: PCT/AT2021/060079
§ 371 (c)(1),
(2) Date: Sep. 2, 2022

(87) PCT Pub. No.: WO2021/174280
PCT Pub. Date: Sep. 10, 2021

(65) Prior Publication Data
US 2023/0106145 A1  Apr. 6, 2023

(30) Foreign Application Priority Data

Mar. 5, 2020  (AT) .............................. A 50173/2020

(51) Int. Cl.
*H02M 7/5387* (2007.01)
*H02M 1/00* (2006.01)
*H02M 1/12* (2006.01)
(52) U.S. Cl.
CPC ....... *H02M 7/5387* (2013.01); *H02M 1/0043* (2021.05); *H02M 1/123* (2021.05); *H02M 1/126* (2013.01)
(58) Field of Classification Search
CPC .. H02M 7/5387; H02M 1/0043; H02M 1/123; H02M 1/126
See application file for complete search history.

(56) References Cited

U.S. PATENT DOCUMENTS 11,418,106 B2* 8/2022 Tian ..................... H02M 7/483
11,664,777 B2* 5/2023 Spesser ................. H01F 27/28
　　　　　　　　　　　　　　　　　　　307/9.1
2013/0301327 A1* 11/2013 Wagoner ............. H02M 7/5387
　　　　　　　　　　　　　　　　　　　363/132

FOREIGN PATENT DOCUMENTS

DE　　29800567　　4/1998
DE　　10225409　　12/2003
(Continued)

OTHER PUBLICATIONS

International Search Report and the Written Opinion dated Apr. 17, 2021 From the International Searching Authority Re. Application No. PCT/AT2021/060077 and its Translation of Search Report Into English. (10 Pages).
(Continued)

*Primary Examiner* — Adolf D Berhane

(57) ABSTRACT

The invention relates to a converter assembly for converting a DC voltage from a DC voltage source, e.g. a battery, a fuel cell or a DC voltage intermediate circuit, into an N-phase AC voltage, e.g. for supplying an N-phase electric machine, comprising a connected inverter unit (1) having a number M of electronically controllable half bridges (2, 2', 2a, 2a', 2b, 2b') for each of the N phases, wherein M is greater than one, a control unit (3) controlling the half bridges (2, 2', 2a, 2a', 2b, 2b') which is designed to activate the half bridges (2, 2', 2a, 2a', 2b, 2b') in a phase-offset manner with a switching frequency fT, wherein the phases are connected to a respective winding (5, 5', 5") of a common-mode choke (10) with a common magnetic core for damping electrical common-mode interference, and wherein the outputs of the half bridges (2, 2', 2a, 2a', 2b, 2b'), supplying said phases, are interconnected via interleaving chokes (4, 4', 4a, 4a', 4b, 4b'), wherein a first resistance-damped capacitor circuit (6) is provided at the output of the interleaving chokes (4, 4', 4a, (Continued)

4*a'*, 4*b*, 4*b'*) forming a first LC filter stage (8), and a second resistance-damped capacitor circuit (7) is provided at the output of the common-mode choke (5, 5', 5") forming a second LC filter stage (9).

20 Claims, 1 Drawing Sheet

(56) References Cited

FOREIGN PATENT DOCUMENTS

| | | |
|---|---|---|
| DE | 102008026870 | 12/2009 |
| EP | 2665170 | 11/2013 |

OTHER PUBLICATIONS

Internationaler Recherchenbericht und Schriftlicher Bescheid [International Search Report and the Written Opinion] dated Jun. 4, 2021 From the International Searching Authority Re. Application No. PCT/AT2021/060079 and its Translation of Search Report Into English. (11 Pages).

* cited by examiner

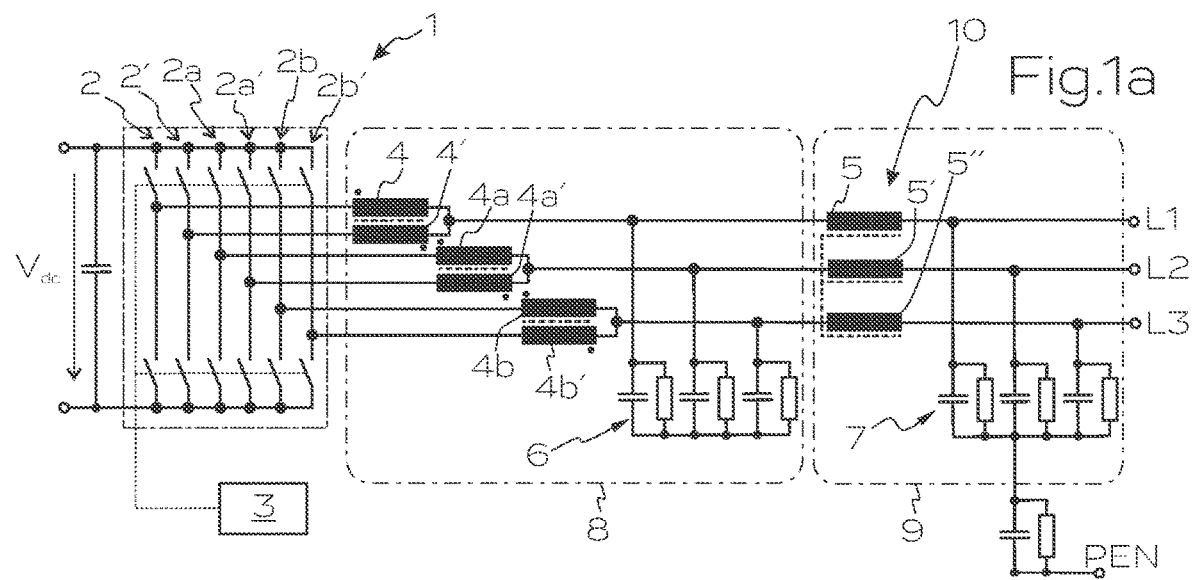
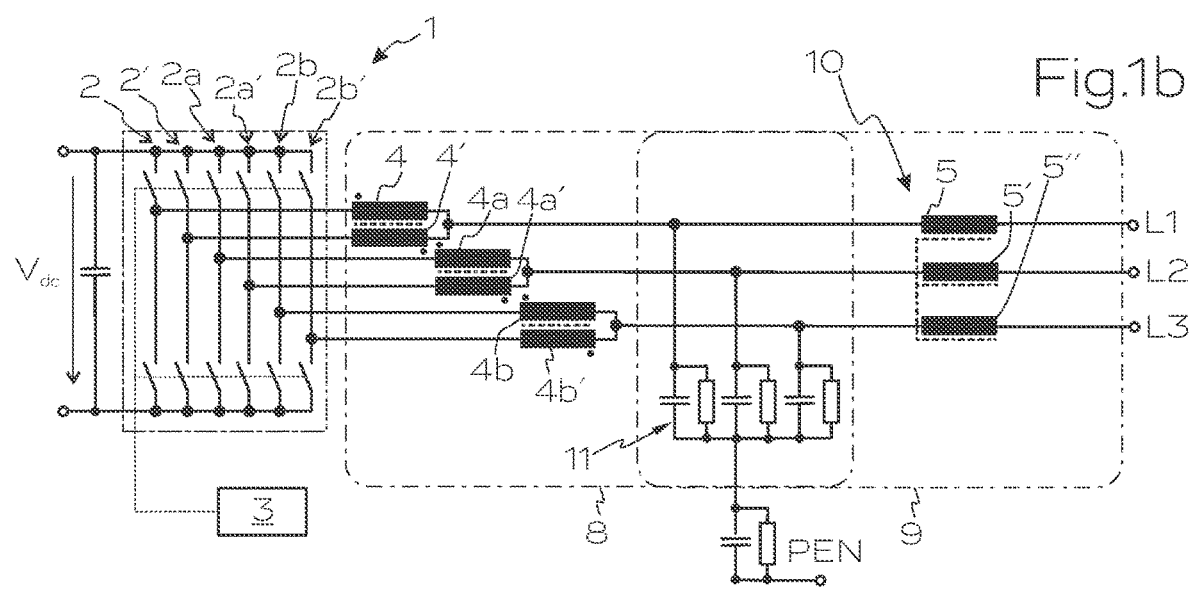
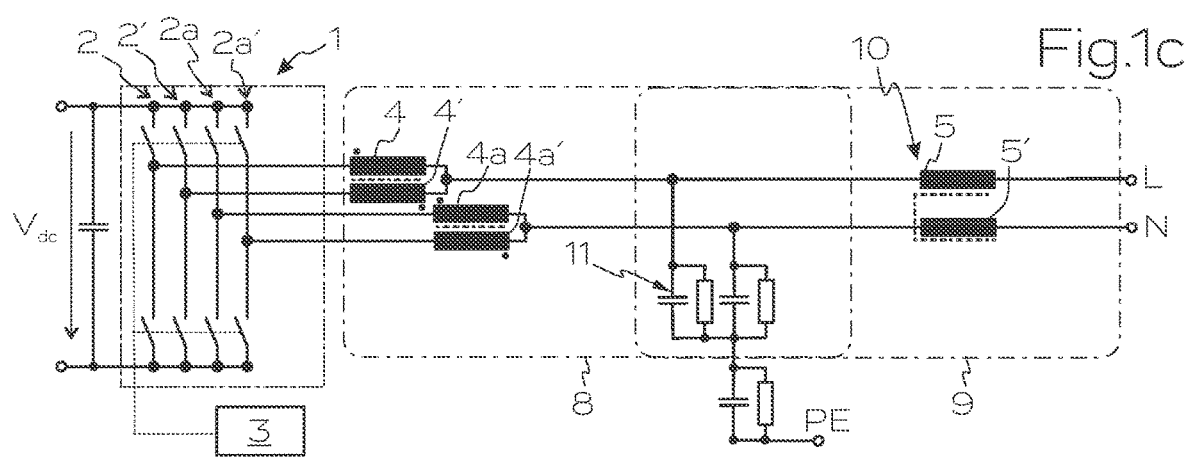

CONVERTER ASSEMBLY

RELATED APPLICATIONS

This application is a National Phase of PCT Patent Application No. PCT/AT2021/060079 having International filing date of Mar. 5, 2021, which claims the benefit of priority of Austrian Patent Application No. A 50173/2020 filed on Mar. 5, 2020. The contents of the above applications are all incorporated by reference as if fully set forth herein in their entirety.

The invention relates to a converter assembly for converting a DC voltage from a DC voltage source, e.g. a battery, a fuel cell or a DC voltage intermediate circuit, into an N-phase AC voltage or vice versa.

FIELD AND BACKGROUND OF THE INVENTION

Converter assemblies are fundamentally known from the prior art. These usually use connected inverters with semiconductor bridge circuits which replicate a sinusoidal AC voltage of short pulses of high frequency (a few kHz to above 20 kHz) by means of a modulation process, for example pulse width modulation (PWM). Such inverters are also referred to as sine wave inverters. The semiconductor switches switch the DC voltage on and off with high frequency; the mean value of the high-frequency, pulse-width-modulated switching frequency is the output AC voltage. The output AC voltage is thus composed of small pulses of varying width and thus approximates a sinusoidal voltage curve as typically used in the grid.

SUMMARY OF THE INVENTION

Such converter assemblies are suitable for a wide range of industrial applications. For example, a stand-alone supply network with multiphase AC voltage, for example in the form of an uninterruptible power supply (UPS), can be provided from a DC voltage source, usually a battery.

Industrial applications are also conceivable, for example for the independent operation of a production line. Furthermore, such converter assemblies are also used in test stands for electrically and/or conventionally powered vehicles.

In such test stands, electrical power is provided via a DC voltage intermediate circuit, and machine converters convert the DC voltage into the AC voltage required for the respective electrical machine, for example an electric motor.

Especially in test stands, but also in other applications, especially industrial applications, these converter assemblies are usually also designed for bidirectional operation, i.e. they enable an electrical power flow both from the DC voltage side to the AC voltage side and also vice versa. This is made possible, among other things, through the use of bidirectional connected inverters, so-called active front-end converters.

However, due to the high power of usually over 100 kW and the high DC voltage of usually over 500 V required for test stands, the converter assemblies are usually too large for example to be arranged directly on an electrical load machine of the test stand which is to be driven (e.g. a dynamometer). Consequently, longer electrical supply lines are required. In addition, the high-frequency switching processes of the pulse width modulation can cause high-frequency interference in a DC voltage intermediate circuit of the test stand, and possibly also ripple currents in a mains line or a connected electrical machine.

This interference leads to a violation of regulations regarding EMC (electromagnetic compatibility) and can also cause ripple torques in a driven electrical machine, which should be prevented.

In order to avoid this high-frequency interference, EMC line filters are known. In the prior art, these are arranged in the phases of the AC voltage network. However, such line filters are relatively large due to the LC components used and thus make a compact design of the converter assembly more difficult.

It is an object of the invention to solve at least one of these problems and to provide a compact converter assembly which can be used, for example, as a local line converter in a test stand for vehicles or in other applications, for example a local stand-alone network or a UPS. The generation of high-frequency interference should thereby be avoided or reduced to a minimum.

These and other objects are achieved by a converter assembly according to claim 1.

A converter assembly according to the invention is designed to convert a DC voltage into an N-phase AC voltage or vice versa. This may include, in particular, actively connected converters or inverters (so-called active front-end converters) which are suitable for energy recovery, i.e. for bidirectional operation. It should be noted that the flow direction of the electrical power transmitted between the DC and AC voltage sides is not relevant for the present invention.

When used as an inverter, the DC voltage can be provided by a DC voltage source, e.g. a battery, a fuel cell or a DC voltage intermediate circuit, and the AC voltage can be designed to supply an N-phase electrical machine.

However, other applications for connected converters are also envisaged according to the invention.

According to the invention, the converter assembly comprises a connected inverter unit having a number M of electronically controllable half bridges for least one, but preferably for each of the N phases, wherein M is greater than one. A control unit controlling the half bridges is also provided which is designed to activate the half bridges in a phase- or time-offset manner with a substantially constant switching frequency $f_T$.

This results in an increase in the switching frequency of the PWM process by the factor M and a smoother and more interference-free replication of a sinusoidal signal can be achieved even at high voltages and high frequencies.

In order to damp electrical common-mode interference, the phases are connected to a respective winding of a common-mode choke with a common magnetic core. To reduce interference, the outputs of the half bridges which supply the same phase are in each case interconnected via interleaving chokes. In other words, those M half bridges intended to supply one of the N phases are interconnected with a common iron core via M interleaving chokes. This has the advantage that a smooth transition between the connected half bridges is possible and interference is reduced. The interleaving chokes are preferably current-compensated chokes, i.e. the windings are wound in opposition on a common core.

The control unit can be designed to activate the half bridges of a phase in each case for an identical duty cycle T and to activate the M half bridges in each case associated with a phase with a time delay of T/M. For example, where M=2, the two half bridges assigned to a phase are activated with a delay of T/2 in these exemplary embodiments.

According to the invention, a first LC filter stage and a second LC filter stage are provided to dissipate high-frequency interference. The first LC filter stage is formed by the interleaving chokes and a resistance-damped capacitor circuit. The second LC filter stage is formed by the common-mode choke and a resistance-damped capacitor circuit.

According to the invention, the first LC filter stage may be formed by the interleaving chokes and a first resistance-damped capacitor circuit, and the second LC filter stage formed by the common-mode choke and a separate second resistance-damped capacitor circuit. The first capacitor circuit is thereby arranged at the output of the interleaving chokes, i.e. between the interleaving chokes and the common-mode choke, and the second capacitor circuit is arranged at the output of the common-mode choke.

However, according to the invention, it may also be the case that the first LC filter stage is formed by the interleaving chokes and a combined resistance-damped capacitor circuit, and the second LC filter stage is formed by the common-mode choke and this combined resistance-damped capacitor circuit. In this case, only one resistance-damped capacitor circuit is provided for both LC filter stages; in this case, the combined capacitor circuit is arranged between the interleaving chokes and the common-mode choke.

The formation of two LC filter stages means it is not necessary to provide a separate line filter; according to the invention the interleaving chokes and common-mode chokes which are required in any case are dimensioned in such a way that they dissipate interference that arises due to the connected inverter.

In particular, according to the invention, the inductances in the longitudinal direction, which are not required per se, i.e. the longitudinal reactance of the interleaving chokes or the leakage reactance of the common-mode chokes, are dimensioned in such a way that the desired filter effect results. This means that no further EMC filters are required in order to comply with EMC standards such as DIN EN 55011 and DIN EN 61000. In particular, the first LC filter stage and the second LC filter stage may be dimensioned in such a way that a total harmonic distortion (distortion factor) of 3% in each phase is not exceeded.

According to the invention, the cut-off frequency of the first LC filter stage may differ from the cut-off frequency of the second LC filter stage. In particular, the cut-off frequency of the first LC filter stage may be lower than the cut-off frequency of the second LC filter stage. In particular, the cut-off frequency of one LC filter stage, preferably the first, may lie within the range of M times the switching frequency fT, preferably within the range from around 0.8×M×fT to 1.2×M×fT. As a result, this filter stage ensures the efficient dissipation of interference which occurs with M times the switching frequency.

According to the invention, the cut-off frequency of one LC filter stage, preferably the second, may lie within the range of a multiple of M times the switching frequency fT, for example within the range from 1×M×fT, preferably 4×M×fT, to 10×M×fT or above. As a result, this filter stage ensures the efficient dissipation of harmonics of the switching frequency.

In particular, the phase number N can be equal to three. However, variants with a single phase, i.e. N=1, are also possible according to the invention; in this case, a connected phase L and a connected neutral conductor are provided. The number of the half bridges per phase M can be equal to two, three, four or also higher. The capacitor circuits used for the filter stages can be designed in the form of a star connection of at least N capacitors between the N phases. This means that for each of the N phases a capacitor and a parallel-connected resistor are provided which are arranged relative to each other in a star connection.

The first capacitor circuit can have a capacitance of around 30 μF per phase. The second capacitor circuit can have a capacitance of around 11 μF per phase. However, these values depend on the desired area of application.

According to the invention, the control unit can be designed to control the half bridges in each case with a switching frequency fT from at least around 24 kHz to around 33 kHz. Effectively, due to the phase-offset control of the half bridges, this results in a pulse frequency for each phase of M×fT, i.e., for an exemplary value of M=2, around 48 kHz to around 66 kHz.

According to the invention, the DC voltage may be around 850 V and the inverter unit may be designed to generate a 3-phase line voltage with an amplitude of 400 V and a phase current of 630 A at a frequency of 50 Hz, or with an amplitude of 480 V and a phase current of 525 A at a frequency of 60 Hz.

The windings of the common-mode chokes can in each case have around 4 windings. The ratio of the inductance (longitudinal inductance) of the common-mode chokes to their leakage inductance can be around 200 or higher.

The windings of the common-mode chokes can in each case have an inductance of around 1.8 mH and a leakage inductance of around 3.5 μH at a frequency of around 48 kHz. However, other values are also possible according to the invention.

The interleaving chokes can be designed as current-compensated chokes, i.e. their windings are wound in opposition on a common core.

The interleaving chokes can in particular be designed in such a way that they have no bifilar winding, so that longitudinal and transverse reactance can be adjusted separately from each other. The ratio of the longitudinal inductance to the transverse inductance of the interleaving chokes can lie within a range of around 100 to around 10,000. The interleaving chokes can in particular have a longitudinal inductance of around 7.5 μH and a transverse inductance of around 1.94 mH.

The invention further extends to an active line converter, comprising a converter assembly according to the invention with an AC side (supply side) and a DC side (DC voltage side).

In particular, the line converter can be bidirectional in design, i.e. it can allow power flow in both directions.

The invention further extends to an industrial application, for example a test stand, a stand-alone network or a production line, with such an active line converter, which is designed in particular for bidirectional operation in order to supply and receive electrical power.

Further features according to the invention arise from the claims, the FIGURE and the following description of the FIGURES.

BRIEF DESCRIPTION OF THE SEVERAL VIEWS OF THE DRAWINGS

The invention is now explained in more detail on the basis of non-exclusive exemplary embodiments.

FIGS. 1a—1c show exemplary embodiments of converter assemblies according to the invention.

DESCRIPTION OF SPECIFIC EMBODIMENT OF THE INVENTION

FIG. 1a shows an exemplary embodiment of a converter assembly according to the invention for converting a DC voltage $V_{dc}$ from a DC voltage source, e.g. a battery, a fuel cell or a DC voltage intermediate circuit, into a 3-phase AC voltage (N=3) with the phases L1, L2, L3 for connection to an AC voltage network.

For this purpose, a connected inverter unit 1 is provided. This comprises an active bridge inverter with six half bridges 2, 2', 2a, 2a', 2b, 2b', wherein in each case a phase L1, L2, L3 is supplied via two half bridges (M=2). The half bridges in each case comprise two electronically switchable semiconductor switches, which are connected to an electronic control unit 3. In this exemplary embodiment, the semiconductor switches are designed as SiC switches and have a high dielectric strength. The control unit 3 switches the semiconductor switches in a pulse width modulation process with a frequency of around 33 kHz in order as far as possible to be able to form the ideal sinusoidal shape for each of the phases. Furthermore, the control unit 3 is designed to activate those half bridges pairs which supply the same phase in a phase-offset manner, in such a way that the current of this phase is divided substantially equally between the two half bridges.

For example, the control unit 3 first activates the first half bridge 2 for a certain period of time $t_{on}$ and then the half bridge 2' for an identical period of time $t_{on}$. This halves the power transmitted per half bridge and doubles the frequency of the PWM process per phase. Consequently, the ripple in the output current decreases and interfering feedback into the DC voltage intermediate circuit is also reduced.

In this exemplary embodiment, the outputs of two half bridges which supply the same phase are interconnected via interleaving chokes 4, 4', 4a, 4a', 4b, 4b'. The interleaving chokes are current-compensated and wound on a common iron core for each phase. This allows a particularly ripple-free operation of the converter assembly.

In order to damp electrical common-mode interference, the phases L1, L2, L3 are connected to a respective winding 5, 5', 5" of a common-mode choke 10 with a common magnetic core. This compensates common-mode interference in the phases. A first resistance-damped capacitor circuit 6 is provided at the output of the interleaving chokes 4, 4', 4a, 4a', 4b, 4b' which, in conjunction with the leakage reactance (transverse reactance) of the interleaving chokes, forms a first LC filter stage 8.

A second resistance-damped capacitor circuit 7 is provided at the output of the common-mode chokes 5, 5', 5" which, in conjunction with the leakage reactance (transverse reactance) of the windings 5, 5', 5" of the common-mode choke 10, forms a second LC filter stage 9.

The first and second capacitor circuits comprise capacitors in each case arranged in a star connection and provided with parallel resistors; the neutral point of the second capacitor circuit 7 can be earthed via a PEN or PE connector.

In an exemplary embodiment, not shown, a damping resistor is arranged between the centre of the DC voltage intermediate circuit and the neutral point of the second capacitor circuit 7. The intermediate circuit is thus stabilised with regard to common-mode interference (capacitively coupled to PEN), and the common-mode interference then only occurs in the form of an alternating signal at the neutral point of the first capacitor circuit.

In this exemplary embodiment, the converter assembly is designed for a DC voltage of around 850 V, and the inverter unit 1 is designed to generate a 3-phase line voltage with an amplitude of 400 V and a phase current of 630 A at a frequency of 50 Hz. The DC voltage $V_{dc}$ in the DC voltage intermediate circuit is symmetrically stabilised (not shown) in relation to the ground potential, for example+420 V/−420 V. This reduces earth currents and insulation stresses in downstream units.

In the present exemplary embodiment, the interleaving chokes 4, 4', 4a, 4a', 4b, 4b' are designed with non-bifilar upright windings with around nine windings per leg on a nanocrystalline C-core with high relative magnetic permeability (μr of around 40,000), a core cross-section of around 17 cm² and a very narrow air gap of around 150 μm.

The inductance of each individual winding is around 500 pH, the coupling factor is 0.97, the longitudinal inductance around 7.5 pH and the transverse inductance around 1.94 mH. The assigned first capacitor circuit 6 has a capacitance of around 30 μF per phase, so that the cut-off frequency of the low pass formed by the first filter arrangement 8 assumes a value of around 67 kHz:

$$f = \frac{1}{\sqrt{LC}} = \frac{1}{\sqrt{7.5 \ \mu H \cdot 30 \ \mu F}} = 66.67 \text{ kHz}$$

This corresponds to around 2 times the switching frequency of 33 kHz, so that the interference can be effectively filtered through the switching processes.

In the present exemplary embodiment, the common-mode chokes 5, 5', 5" in each case comprise around 4 windings on a nanocrystalline C-core with high relative magnetic permeability (μr of around 40,000) and a core cross-section of around 14 cm². The inductance of each individual winding is around 1.8 mH, the leakage reactance around 3.5 pH at a frequency of around 48 kHz. The assigned second capacitor circuit 7 has a capacitance of around 11 μF per phase, so that the cut-off frequency of the low pass formed by the second filter arrangement 9 assumes a value of around 161 kHz:

$$f = \frac{1}{\sqrt{LC}} = \frac{1}{\sqrt{3.5 \ \mu H \cdot 11 \ \mu F}} = 161.16 \text{ kHz}$$

This staggered arrangement of two low-pass filters enables efficient filtering of high-frequency interference without the need for additional EMC filter components.

FIG. 1b shows another exemplary embodiment of a converter assembly according to the invention for converting a DC voltage $V_{dc}$ from a DC voltage source into a 3-phase AC voltage (N=3) with the phases L1, L2, L3 for connection to an AC voltage grid.

In this exemplary embodiment, rather than two separate capacitor circuits, a combined capacitor circuit 11 is provided. This interacts with the interleaving chokes 4, 4', 4a, 4a', 4b, 4b' as well as with the windings 5, 5', 5" of the common-mode choke 10 to form two schematically indicated filter stages 8, 9.

When dimensioning the two filter stages, it must be ensured that the capacitor circuit 11 is effective both for the cut-off frequency of the first LC filter stage 8 and also for the cut-off frequency of the second LC filter stage 9; consequently, the elements cannot be dimensioned independently of each other as in the exemplary embodiment according to FIG. 1a. Otherwise, this exemplary embodiment corresponds to the exemplary embodiment according to FIG. 1a.

FIG. 1c shows a further exemplary embodiment of a converter assembly according to the invention for converting a DC voltage $V_{dc}$ from a DC voltage source into a single-phase AC voltage (N=1) with a phase L and a connected neutral conductor N. Both the phase L and the neutral conductor N are provided via a connected inverter unit 1 with in each case two half bridges (M=2). Again, rather than two separate capacitor circuits, a combined capacitor circuit 11 is provided. Otherwise, this exemplary embodiment corresponds to the exemplary embodiment according to FIG. 1b.

The invention is not limited to the described exemplary embodiment, but includes all converter assemblies according to the following claims, and in particular their use in test stands for vehicles.

LIST OF REFERENCE SYMBOLS

1 inverter unit
2, 2', 2a, 2a', 2b, 2b' half bridge
3 control unit
4, 4', 4a, 4a', 4b, 4b' interleaving choke
5', 5" winding
6 first capacitor circuit
7 second capacitor circuit
8 first filter stage
9 second filter stage
10 common-mode choke
11 combined capacitor circuit

The invention claimed is:

1. Converter assembly for converting a DC voltage into an N-phase AC voltage or vice versa, comprising
a connected inverter unit having a number M of electronically controllable half bridges for least one, preferably for each of the N phases, wherein M is greater than one,
a control unit controlling the half bridges which is designed to activate the half bridges in a phase-offset manner with a substantially constant switching frequency fT, wherein,
to damp electrical common-mode interference, the phases are connected to a respective winding of a common-mode choke with a common magnetic core, and wherein
the outputs of the half bridges which supply the same phase are in each case interconnected via interleaving chokes,
wherein a first LC filter stage and a second LC filter stage are provided, wherein the first LC filter stage is formed by the interleaving chokes and a resistance-damped capacitor circuit, and the second LC filter stage is formed by the common-mode choke and a resistance-damped capacitor circuit.

2. Converter assembly according to claim 1, wherein the first LC filter stage is formed by the interleaving chokes and a first resistance-damped capacitor circuit, and the second LC filter stage is formed by the common-mode choke and a second resistance-damped capacitor circuit.

3. Converter assembly according to claim 1, wherein the first LC filter stage is formed by the interleaving chokes and a combined resistance-damped capacitor circuit, and the second LC filter stage is formed by the common-mode choke and the combined resistance-damped capacitor circuit.

4. Converter assembly according to claim 1, wherein the cut-off frequency of one LC filter stage, preferably the first, lies within the range of M times the switching frequency fT, preferably within the range from around 0.8×M×fT to 1.2× M×fT.

5. Converter assembly according to claim 1, wherein the cut-off frequency of one LC filter stage, preferably the second, lies within the range of a multiple of M times the switching frequency fT, preferably within the range from 1×M×fT, preferably 4×M×fT, to 10×M×fT.

6. Converter assembly according to claim 1, wherein N equals one or three.

7. Converter assembly according to claim 1, wherein M equals two, three, four or higher.

8. Converter assembly according to claim 1, wherein the capacitor circuits are formed through the star connection of at least N capacitors, in each case with parallel-connected resistors.

9. Converter assembly according to claim 1, wherein the first LC filter stage and the second LC filter stage are dimensioned in such a way that a total harmonic distortion in each phase of 3% is not exceeded.

10. Converter assembly according to claim 1, wherein the control unit is designed to control the half bridges with a switching frequency fT from at least around 24 kHz to at least around 33 kHz.

11. Converter assembly according to claim 1, wherein in that the DC voltage is around 850 V and the inverter unit is designed to generate a 3-phase line voltage
with an amplitude of 400 V and a phase current of 630 A at a frequency of 50 Hz, or
with an amplitude of 480 V and a phase current of 525 A at a frequency of 60 Hz.

12. Converter assembly according to claim 1, wherein the windings of the common-mode choke in each case have around 4 windings.

13. Converter assembly according to claim 1, wherein the ratio of the inductance of the windings of the common-mode choke to their leakage inductance is over 200.

14. Converter assembly according to claim 1, wherein the windings of the common-mode choke in each case have an inductance of around 1.8 mH and a leakage inductance of around 3.5 µH.

15. Converter assembly according to claim 1, wherein the interleaving chokes are designed as current-compensated chokes.

16. Converter assembly according to claim 1, wherein the ratio of the longitudinal inductance to the transverse inductance of the interleaving chokes lies within a range from around 100 to around 10,000.

17. Converter assembly according to claim 1, wherein the interleaving chokes have a longitudinal inductance of around 7.5 pH and a transverse inductance of around 1.94 mH.

18. Converter assembly according to claim 1, wherein the first capacitor circuit has a capacitance of around 30 µF per phase and/or the second capacitor circuit has a capacitance of around 11 µF per phase.

19. Line converter comprising a converter assembly according to claim 1, wherein the line converter is in particular designed for bidirectional operation.

20. Industrial application, e.g. production line, stand-alone network or test stand, including a line converter according to claim 19.

* * * * *